United States Patent [19]

Kino

[11] 3,816,753

[45] June 11, 1974

[54] PARAMETRIC ACOUSTIC SURFACE WAVE APPARATUS

[75] Inventor: Gordon S. Kino, Stanford, Calif.

[73] Assignee: The Board of Trustees of Leland Stanford Junior University, Stanford, Calif.

[22] Filed: Oct. 18, 1971

[21] Appl. No.: 190,342

[52] U.S. Cl. .................. 307/88.3, 310/8.1, 235/181
[51] Int. Cl. .................. H01v 7/00
[58] Field of Search .................. 330/5.5; 307/88.3; 310/8.1

[56] References Cited

UNITED STATES PATENTS

| | | | |
|---|---|---|---|
| 3,684,892 | 8/1972 | Lean et al. | 330/5.5 |
| 3,760,172 | 9/1973 | Quate | 235/181 |

OTHER PUBLICATIONS

Svaasand, "Applied Physics Letters," Nov. 1969, pp. 300–302

Quate et al., "Applied Physics Letters," June 15, 1970, pp. 494–496

Luukkala et al., "Applied Physics Letters," May 1 1971 p. 393–394.

Shreve et al., "Electronic Letters," Dec. 30 1971, p. 764–766.

*Primary Examiner*—Herman Karl Saalbach
*Assistant Examiner*—Darwin R. Hostetter
*Attorney, Agent, or Firm*—Paul B. Fihe

[57] ABSTRACT

Parametric surface acoustic wave apparatus including means for establishing two acoustic surface waves in a piezoelectric medium in a fashion to establish the conditions for parametric interaction so that various functions of signal processing can be carried out including, for example, signal convolution and correlation, time delay and time inversion, amplification, and oscillation.

2 Claims, 6 Drawing Figures

INVENTOR.
GORDON S. KINO

BY

Paul B. Fihe
PATENT AGENT

INVENTOR.
GORDON S. KINO

BY

PATENT AGENT

PARAMETRIC ACOUSTIC SURFACE WAVE APPARATUS

FIELD OF THE INVENTION

The present invention relates generally to processing of electrical signals at relatively high frequencies, and more particularly, to apparatus utilizing the nonlinear parametric interaction of acoustic surface waves in such signal processing.

"The invention described herein was made in the course of work under a grant or award from the United States Air Force."

BACKGROUND OF THE INVENTION

In recent years, considerable research and development effort has been directed to the application of acoustic surface waves because of inherent and highly desirable characteristics thereof. Initially, acoustic surface waves propagate through piezoelectric materials at a relatively slow velocity approximating $3.5 \times 10^5$ cm/sec., approximately five orders of magnitude less than the velocity of light. This one characteristic alone has stimulated many researchers to explore the possibilities of utilizing surface wave acoustic devices as delay line structures. Specifically, if a 200 MHz signal is introduced into lithium niobate, the wavelength is 17.5 micrometers, and the delay of the signal is approximately 3 microseconds per centimeter. Additionally, the attenuation of high frequency acoustic waves is relatively small, being of the order of 0.1 dB/cm; considerably lower than the loss of an electromagnetic wave in an S-band waveguide. Comparing the acoustic structure with the S-band waveguide, because of the noted slower velocity of the acoustic surface wave, the size of the device constructed for the same frequency range tends to be five orders of magntiude less. Additionally, electro-acoustic transducers for coupling the electromagnetic signal to the piezoelectric medium to establish the acoustic waves are easily and cheaply fabricated by what have now become standard techniques. Finally, because the acoustic surface waves are confined to a layer approximately one wavelength from the surface of the piezoelectric medium, relatively high power densities can be obtained with a relatively modest power input signal. For instance, for a 100 MHz signal on lithium niobate with a wavelength of 33 micrometers and a beam width of 1 millimeter, the acoustic strain is of the order of $10^{-3}$ at an input power level of 1 watt.

SUMMARY OF THE PRESENT INVENTION

Considering all of the foregoing desirable characteristics of acoustic surface wave devices, as presently known, it is the general objective of the present invention to generate acoustic surface waves in a piezoelectric medium at a power level and with frequency and phase characteristics such that conditions for nonlinear parametric interaction of such waves are also met thus enabling the accomplishment of improved signal processing including but not limited to apparatus for achieving convolution and correlation of electrical signals, time delay and time inversion thereof, as well as amplification and oscillation. Briefly, such objective is achieved by applying one or more electromagnetic signals through suitable transducers to a piezoelectric medium so that acoustic surface waves are established therein. The applied signal is at a power level such that nonlinear effects are achieved so that Hook's law (stress is proportional to strain) is no longer obeyed, and in particular a component of electric displacement which is proportional to the square of the strain in the piezoelectric medium is obtained, as will be explained in more detail hereinafter. As mentioned hereinabove, in the case of the establishment of acoustic surface waves, but a relatively low input power level of but several watts is all that is requisite to develop the requisite nonlinear effect.

Additionally, in accordance with the present invention, at least two propagating acoustic waves are established in the piezoelectric medium and are chosen so that the conditions for parametric interaction, phase matching and frequency conservation are met. If such conditions are met, the component of electric displacement will be proportional to the product of the amplitudes of the two modulated acoustic waves in the piezoelectric medium which will provide the output of the arrangement. If the conditions are not met, no output will be observed.

The applications of the basic mechanism if nonlinear parametric interaction are manifold. If, for example, an electromagnetic signal modulated to provide a short rectangular pulse is introduced simultaneously to both ends of a piezoelectric medium through separate and suitable transducers, two acoustic waves will be generated to travel in opposite directions towards one another. If the input power is of a sufficient level to provide the nonlinear action, as briefly described hereinabove, and, furthermore, if the phase and frequency conditions for parametric interaction are met, the observed output at a third central transducer will be in the form of a triangular pulse whose amplitude is the integrated product of the input signal. More particularly, the propagation of the two acoustic signals along the piezoelectric medium shifts these two signals one with respect to the other as a function of time. The nonlinear parametric process briefly described hereinabove effects the multiplication of the two signals and the output electrode effects the integration of their product. Accordingly, the described action represents a process for obtaining the convolution of the two input signals and in this particular instance where the same signal is introduced to both ends of the piezoelectric medium, the process is one of auto-convolution.

Since the stated conditions of nonlinear parametric interaction must be precisely met, all signals not meeting such conditions will be discriminated against and, in particular, if two separate signals are introduced to the opposite ends of the piezoelectric medium, an output will be observed only when such conditions are met and, by way of example, extraneous noise or other signals will be highly discriminated against. Thus, applications of the mechanism to radar and electronic pattern recognition are immediately apparent.

Several inherent factors render the described mechanism extremely advantageous for these and other applications. Initially, as has been mentioned hereinabove, the output signal represents the integrated product of the parametrically interacted input signals so as to be easily observed. Additionally, because of the shift or translation of the signals, their relative motion is at twice the acoustic velocity and the output triangular pulse is "compressed;" that is, has a length which is one-half that of the input pulse thus to provide, for example, more accurate resolution in a radar operation.

Additionally, as a result of the shifting of the two acoustic signals, if the input signals are introduced at a given frequency $\omega$ , the output signal will be observed at the sum of the input frequencies or, in other words, at twice the frequency, thus allowing excellent frequency discrimination between the input and output signals.

It will of course be recognized that the precise correspondence of the two input signals in the mechanism hereinabove described will only result if the two pulses introduced are symmetric (e.g. rectangular as described) since they travel through the piezoelectric medium in opposite directions. If a precise "correlation" is desired between two asymmetrical signals such as are employed, for example, in present day relatively sophisticated radar operations, yet the two signals are to be propagated as acoustic waves in opposite directions, it is necessary that an initial time reversal or inversion of one of the signals be provided to insure an output only if a precise correlation of the signals is to be obtained. In accordance with an additional aspect of the present invention, an arrangement can be made wherein time inversion of an asymmetric signal is readily obtained. Generally, if an asymmetric pulse, triangular, or of any shape, is introduced to one end of the piezoelectric medium so as to propagate therealong in what shall be denominated as a forward direction and a pip or delta function, having a very short length or duration as compared to the duration of the finest detail in the signal which is to be observed, is also introduced to the piezoelectric medium and the conditions for nonlinear parametric interaction are observed, a new signal constituting a time inversion of the asymmetric input signal is generated to travel in the opposite direction and can be coupled from the piezoelectric medium through a suitable transducer. If this time inverted signal is supplied to one end of a piezoelectric medium in the manner previously described and the original signal is applied to the opposite end, if the parametric interaction conditions are observed as in the described convolution operation, a "correlation" will be immediately obtained.

It will be immediately observed that in the previously described arrangement for achieving time inversion of a signal, a certain time delay between the input signal and the time inverted output signal will occur depending upon the time of introduction of the pip or delta function. Accordingly, it will immediately be obvious that an electronic variable time delay apparatus can readily be provided through the expedient of controlling the time of introduction of the delta function or pip, and because of the previously noted relatively slow velocity of the acoustic waves in a piezoelectric medium, variable time delays over a relatively wide range can be achieved with a structure of but relatively modest dimensions.

Because of the noted nonlinear parametric interaction of two acoustic waves, it is also obvious that amplification of a signal at a predetermined frequency can be obtained by introducing a pump signal to the same piezoelectric medium at double the signal frequency, so that in accordance with the recited conditions of nonlinear parametric interaction, an idler frequency equal to the signal frequency (the difference frequency) will be generated to produce a growing wave at both the signal and idler frequencies. Extrapolating, one can readily visualize the introduction of a pump signal at a frequency giving rise to oscillation at a subharmonic frequency, as will be explained in detail hereinafter.

BRIEF DESCRIPTION OF THE DRAWINGS

The stated objective of the invention and the manner in which it may be achieved for various application, as summarized hereinabove, will be more readily understood by reference to the following detailed description of the exemplary structures shown in the accompanying drawings wherein.

DETAILED DESCRIPTION OF THE EXEMPLARY EMBODIMENTS OF THE INVENTION

Figure 1:
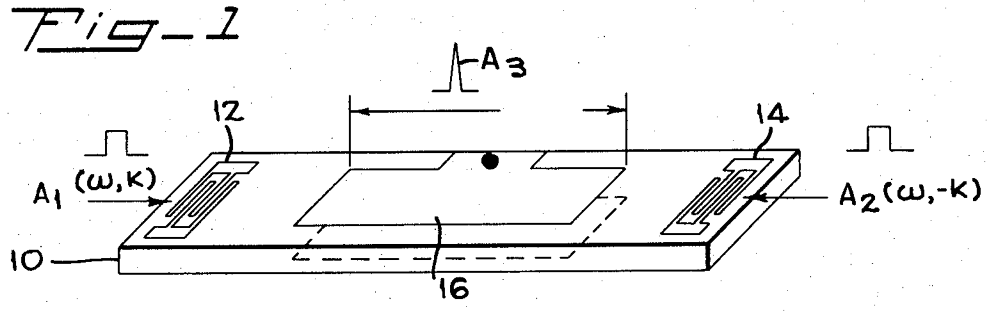
FIG. 1 is a diagrammatic perspective view of an apparatus arranged to provide for autoconvolution of two input signals.

With initial reference to FIG. 1, a piezoelectric medium 10 in the form of a thin platelike piezoelectric crystal such as lithium niobate, bismuth germanium oxide, crystaline quartz or PZT ceramic is shown. If the crystal be one of piezoelectric lithium niobate, for example, the upper and lower surfaces of the crystal in one embodiment are Y-cut so that acoustic surface waves generated at the upper surface will propagate along the Z axis of the crystal, a strong coupling direction.

To allow the generation of acoustic surface waves, input interdigital transducers 12 and 14 are fixed to the upper surface of the piezoelectric medium 10 adjacent opposite ends thereof, each transducer consisting of two sets of interleaved metal electrodes called fingers which are deposited on the piezoelectric surface so that a radio-frequency potential applied between adjacent fingers will generate an acoustic surface wave. The finger spacing is determined by the frequency to be introduced and is equivalent to a distance of one half wavelength at such frequency. These input transducers 12, 14, in and of themselves, form no part of the present invention, having been described and discussed in detail in an article "Design Of Surface Wave Delay Lines With Interdigital Transducers" IEE Transactions on Microwave Theory and Techniques, Vol. MTT-17, No. 11, Nov., 1969, pp. 865-873. Such transducers provide excellent coupling and enable attainment of practical operating bandwidths in excess of 100 MHz.

To provide the output transducer 16 for the piezoelectric crystal 10, two thin metal gold films are applied to the upper and lower surfaces of the crystal adjacent its central portion, such form of transducer being well known and having been utilized and described by Svaasand in his article "Interaction Between Elastic Surface Waves In Piezoelectric Materials," Applied Physics Letters, 15,300 (1969).

In order to provide for nonlinear parametric interaction of two acoustic waves and more particularly to perform a convolution operation in FIG. 1 structure, two input electromagnetic signals $A_1$ and $A_2$ in the form of identical rectangular modulated pulses of a radio frequency wave are simultaneously applied to the input transducers 12, 14 at the opposite ends of the crystal so as to generate two oppositely propagating surface acoustic waves which can be parametrically coupled within the crystal 10 to provide the desired output signal $A_3$ at the output transducer 16.

In order to provide such parametric coupling, the conditions of phase matching and frequency conservation must be observed. Phase matching requires that $k_1 + k_2 = k_3$ where $k$, the propagation vector is equal to the radian frequency, $\omega$ , divided by the acoustic velocity, $v$. Frequency conservation, in turn, requires that $\omega_1 + \omega_2 = \omega_3$ , these conditions for parametric coupling having been explained in detail in Chapter 5, W. H. Louisell, "Coupled Mode And Parametric Electronics," 1960.

In the present instance, the two input signals $A_1$, $A_2$ applied to the transducers 14, 14 in FIG. 1 are the same frequency $\omega$ and, as previously mentioned, also have the same modulation envelope in a form of a rectangular pulse. Accordingly, in terms of the frequency conservation condition $\omega + \omega = 2\omega$ so that the output signal $A_3$ will be at twice the frequency of the input signals. With respect to phase matching, because of the opposite propagation directions of the two acoustic waves $A_1$, $A_2$ the propagation vectors of the two signals are reversed in sign and as a consequence $k + (-k) = 0$. Accordingly, there is no spatial variation in the output electric displacement or polarization, D, of the parametrically combined waves.

If the conditions for parametric coupling are met and sufficient power is introduced to establish nonlinear parametric interactions, the resultant displacement or polarization, D, is proportional to the product of the strain amplitudes of the modulated acoustic waves. This may be explained in accordance with the discussion of electric displacement in Piezoelectric Crystals And Their Applications To Ultrasonics by W. P. Manson, 1950, pg. 463, indicating that D is a function of both the electric field E and the strain S so that in the case of the two signals herein introduced can be represented by the following equation:

$$D = B(S_1 + S_2) + C(E_1 + E_2) + F(E_1 + E_2)^2 + G(E_1 + E_2)(S_1 + S_2) + (K/2)(S_1 + S_2)^2$$

wherein B, C, F, G and K are constants, $E_1$ and $E_2$ are the electric fields, and $S_1$ and $S_2$, the strain amplitudes of the two acoustic waves $A_1$ and $A_2$. The first two terms will be recognized as linear, the third is the electro-optic coefficient which relates to the change of dielectric constant with electric field, and the fourth as the photoelastic constant which relates to the change in dielectric constant with strain. The fifth term, which is that critical to the operation of the present invention, is related to the change in the velocity of sound with electric field. In the case under consideration here, $E_1$ and $E_2$ are zero so that only the fifth nonlinear term need be considered and the foregoing equation can be reduced to the simple phenomenological equation:

$$D = KS_1S_2$$

Thus, it is seen, as stated hereinabove, that the electric displacement or polarization, $D$, is proportional to the product of the strain amplitudes, $S_1$ and $S_2$, of the modulated acoustic waves, $A_1$ and $A_2$.

In the present specific case where the two like rectangular modulation pulses of radio freqeuncy signals at identical frequencies are delivered to opposite ends, an initial translation of the signals results from their propagation in opposite directions. When the signals $A_1$ and $A_2$ pass one another, the displacement D at any point is proportional to the product of the strain amplitudes at the same point, as explained above and in coupling to the output transducer 16, an integration of D is attained, and as a result the output signal $A_3$ is in the form of a triangle which because of the integration has an amplitude proportional to the width of the input pulses and a duration one half that of the original pulses. By way of explanation, it is easy to see that as the two identical signals $A_1$, $A_2$ pass each other there will be an incident of time in which they exactly superimpose to provide the maximum output signal level which will drop off sharply at either side of such maximum point thus to produce the described triangular shape of the output pulse. The time compression of the output pulse $A_3$, in turn, results from the fact that the relative velocity of the two signals is twice the acoustic velocity. In summary, pulse compression is attained; the compressed pulse is of larger amplitude so that the final result is compression gain.

The described nonlinear parametric interaction of two identical modulated signals introduced at opposite ends to the FIG. 1 structure essentially constitutes an auto-convolution of the two signals. Convolution, as explained in detail in Chapter 3 of Bracewell, "The Fourier Transform And Its Applications" (1965) is defined mathematically as the relation of two time functions, f(t) and g(t), $$Cn = \int f(\tau)g(t - \tau)d\tau$$

and correlation is the time reversed or inverted relationship, $$Cr = \int f(\tau)g(\tau - t)d\tau$$

$t$, in each equation being representative of time displacement of one function relative to the other. Accordingly, the mathematical evaluation of either operation can be considered as a process whereby first, the two functions are translated in time with respect to one another by a specified amount, $t$, secondly, the product of the translated functions is taken, and finally, this product is integrated. Quite obviously, the mathematical process can be physically realized if two signals can be made to undergo the three steps of the process, translation, multiplication, and integration.

In the FIG. 1 arrangement, the opposite propagation of the two signals provides for the translation thereof with respect one another as a function of time, the described nonlinear parametric process effects multiplication of the two signals and the output transducer effects integration of the product of the two signals, thus to fulfill in the process the conditions analogous to the mathematical operation of convolution.

The autoconvolution of two identical input signals at 105 MHz of approximately 0.1W modulated with three microsecond pulses has been obtained with a lithium niobate crystal 10 approximately two millimeters thick and having input transducers 12, 14 generally as described in connection with FIG. 1 and specifically consisting of aluminum fingers 0.2 micrometers thick, and 8 micrometers wide with 8 micrometer gaps therebetween. After the nonlinear parametric interaction of the signals, the convolution output in the form of a triangular output pulse with compression gain resulted and was substantially noise free.

Whereas the FIG. 1 arrangement with identical signals $A_1$, $A_2$ introduced to the transducers 12, 14 at both ends provides for autoconvolution and no spatial variation in the output wherefore the output transducer 16 in the form of the thin films can be utilized, it is to be expressly understood that convolution of signals having different frequencies can also be obtained. By way of example, with reference to FIG. 2, a flat piezoelectric crystal 18 has two input transducers 20, 22 adjacent its opposite ends into one of which a signal $A_4$ having a frequency, $\omega_1$, and a propagation constant, $k_1$, is introduced, and into the other of which a distinct signal $A_5$ with a frequency, $\omega_2$ , and propagation constant, $k_2$, is introduced.

Figure 2:
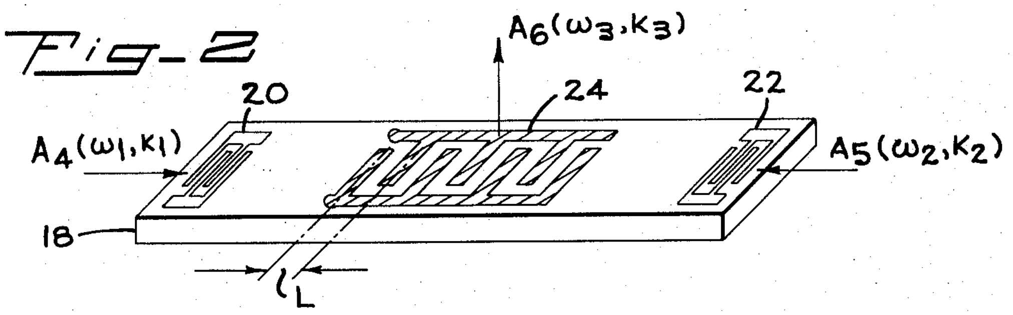
FIG. 2 is a similar diagrammatic perspective view of an arrangement for establishing convolution of signals of different frequencies.

An output signal, $A_6$, is representing the convolution of the signals $A_4$ and $A_5$ is obtained as a result of parametric interaction at an output interdigital transducer 24. In order to achieve the desired nonlinear parametric interaction, it is of course again necessary to observe the requisite conditions, frequency conservation and phase matching, so that the output signal $A_6$ obtained in a fashion similar to that discussed with the first embodiment of the invention will be at a frequency, $\omega_3$, equivalent to the sum of $\omega_1$ and $\omega_2$, and with a propagation vector of $k_3$ equivalent to the difference of the propagation vectors of the input signals or in other words $k_1 - k_2$. Even though the output frequency represents the sum of the input frequencies, the output transducer 24 can have a relatively coarse pitch equivalent to that of an ordinary transducer designed to operate at a frequency equal to the difference of the frequencies of the two input signals. Specifically, the finger pair of spacing L of the output transducer 24, as indicated in FIG. 2, will be determined by the relation, $k_3 L = 2\pi$. Thus if $k_3$ $(k_1 - k_2)$ is made small, $L$ can be large. Obviously, the coarse pitch of the transducer 24 simplifies its fabrication for relatively high frequency outputs.

It will also be apparent that the interaction of the two signals $A_1$ , $A_2$ introduced in the FIG. 1 structure in effect provides the correlation operation because of the symmetry of the signals, but it will be seen that if the two signals had an asymmetrical modulation envelope, the introduction of the two signals at the opposite ends and their propagation in opposite directions would preclude the precise overlap necessary for correlation. However, in accordance with an additional aspect of the present invention, a nonlinear parametric interaction arrangement can be provided initially to achieve the time reversal or inversion of an input signal whereupon an arrangement similar to that shown in FIG. 1 can be utilized in conjunction therewith to perform the desirable correlation process.

Figure 3:
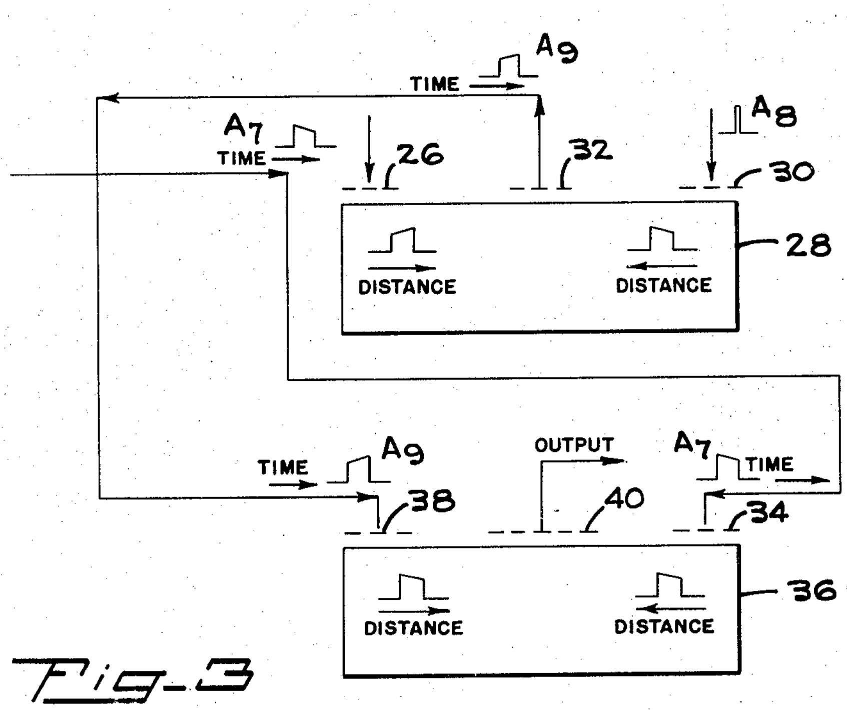
FIG. 3 is a diagrammatic view of a system to provide a correlation operation.

With reference to FIG. 3, an input signal $A_7$ having a modulation envelope slanting downwardly with advancing time is introduced through an interdigital transducer diagrammatically indicated at 26 into a piezoëlectric crystal 28. As a consequence, the established acoustic wave signal progressing to the right in the crystal 28 has a rearwardly sloping envelope in terms of space or distance therealong. If, now, a very narrow pulse or delta function $A_8$ is introduced to a transducer 30, at the opposite end of the crystal and the conditions for nonlinear parametric interaction are observed, a reflected idler wave will be generated to travel in the opposite direction or to the left with a reversed envelope slope. Consequently, the signal $A_9$ extracted from a central output transducer 32 will, as a time function, have the reverse envelope slope from the introduced signal $A_7$, thus providing a time reversed or inverted signal. If the initial reference signal $A_7$ is also introduced through a transducer 34 at the right hand end of an additional piezoelectric crystal 36 and the time-inverted signal $A_9$ is introduced to the left hand end thereof by a transducer 38, in terms of distance along the crystal, the two acoustic waves will have the identical configuration, and the output taken from the crystal 36 at a central transducer 40 will accordingly provide the correlation function as mathematically described hereinbefore. In terms of applications, it is immediately obvious that this arrangement can be used to compare a transmitted radar signal of complex configuration with the returning echo and because the product of the amplitudes of the transmitted and reflected signals is obtained as a result of the nonlinear parametric interaction, relatively weak returning signals can be detected.

As mentioned in the introduction in the present specification, one of the significant aspects of acoustic surface wave devices is the relatively slow propagation of the acoustic surface waves which has stimulated investigation of such devices for purposes of electronic delay lines. In accordance with the enunciated principles of nonlinear parametric interaction of the present invention, an electronically variable delay apparatus or a tapped delay line can easily be achieved. With specific reference to FIG. 4, an input signal $A_{10}$ having an arbitrary modulation envelope is introduced to the left end of a piezoelectric crystal 42 of the general type previously described through an interdigital transducer 44 so that an acoustic wave having an envelope of reverse configuration in terms of distance will propagate to the right along the crystal. In turn, a delay control signal in the form of a pip or delta function $A_{11}$ is delivered to the right end of the piezoelectric crystal 42 through another interdigital transducer 46 to accordingly propagate to the left, as indicated. Assuming that the proper conditions for nonlinear parametric interaction are observed, as discussed in detail hereinabove, an output signal $A_{12}$ can be taken from a central transducer 48 on the piezoelectric crystal 42, such output signal being reduced in its duration to one half of the input signal and having an amplitude constituting the product of the strain amplitudes of the two acoustic signals. Thus, except for its duration, the output pulse $A_{12}$ will constitute a reproduction of the input signal.

Because the output signal $A_{12}$ will only be observed at the time of interaction between the two input signals, the arbitrary input signal $A_{10}$ and the pip $A_{11}$, it is apparent that if the time of introduction of the pip signal $A_{11}$ is varied, in turn, the delay time between the introduction of the arbitrary signal $A_{10}$ and the extraction of the output signal $A_{12}$ can be varied, thus in essence, providing an electronic variable time delay mechanism.

Figure 4:
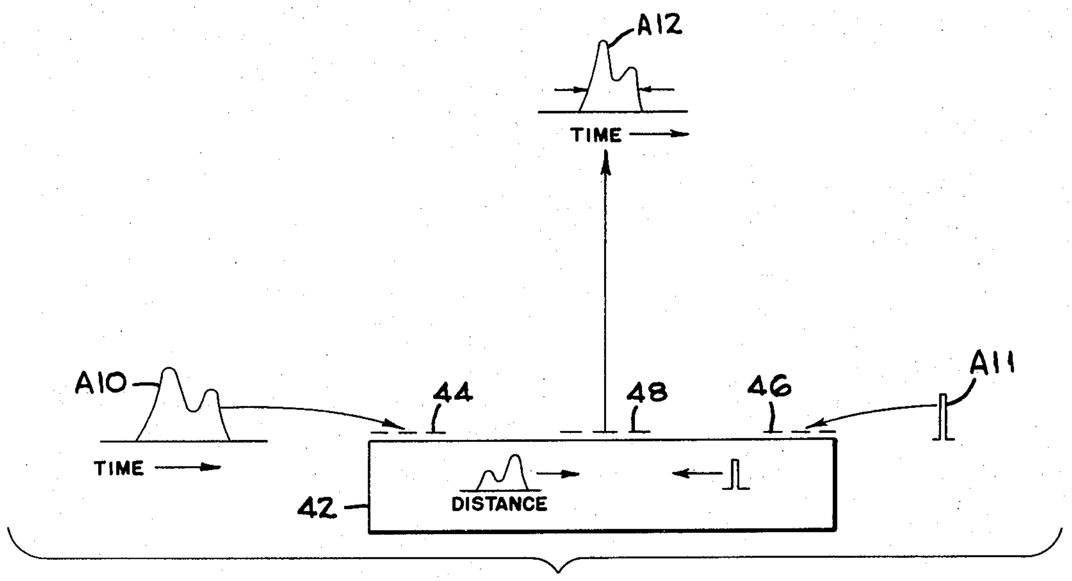
FIG. 4 is a diagrammatic view illustrating an arrangement for achieving an electronically variable time delay of an input signal.

In a particular experiment, a 4 microsecond radio frequency pulse constituted the input signal $A_{10}$ and a pip or delta function in the form of a 0.7 microsecond spike was introduced at variable times to the right end of a piezoelectric crystal 42 of the type shown in FIG. 4 and through control of the injection time of the pip, variable delays of the input signal over several microseconds was achieved. It will be obvious that a plurality of pips can also be injected at spaced time intervals to provide an electronic "tapped" delay line.

Figure 5:
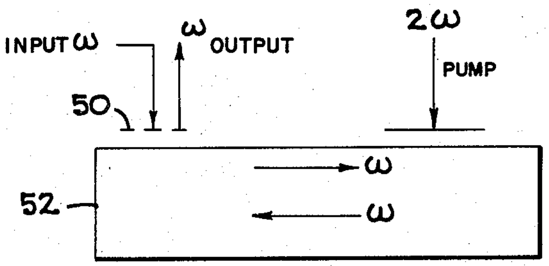
FIG. 5 is a similar diagrammatic illustration of an arrangement providing amplification of an input signal.

In the foregoing description of several embodiments of the invention, it has been noted that the nonlinear parametric interaction provides an output which is proportional to the product of the strain amplitudes of two modulated acoustic propagating waves wherefore the technique suggests itself as an important basic mechanism for obtaining amplification. With specific reference to FIG. 5, an input signal at a frequency $\omega$ which is to be amplified is delivered through an interdigital transducer 50 to the left hand end of a piezoelectric crystal 52 so as to propagate toward the right, as indicated. In turn, a pump signal at a frequency $2\omega$ is delivered through a film transducer 54 at the right end of the piezoelectric crystal 52 so as to propagate towards the left, as indicated. If, in turn, the conditions for parametric interaction are observed, as described in detail hereinabove, an idler signal at a frequency, $\omega$ , where $\omega = 2\omega -$ will be generated and will propagate towards the left. Both of the propagating input and idler signals will continue to interact with the pump signal at frequency $2\omega$ so that both will be amplified as a result of obtaining the products of the strain amplitudes. The amplified signal at frequency $\omega$ can, in turn, be extracted from the left hand end of a piezoelectric crystal through the interdigital transducer 50.

It will be observed that the condition for nonlinear parametric interaction will apply both to the sum and difference frequencies, and as a consequence, a fourth signal will be generated at a frequency, $3\omega$ . However, the interdigital transducer 50 is designed only for coupling to signals at the frequency, $\omega$ so that the unwanted sum freqeuncy, $3\omega$ , is, in effect, filtered out by the described arrangement.

Figure 6:
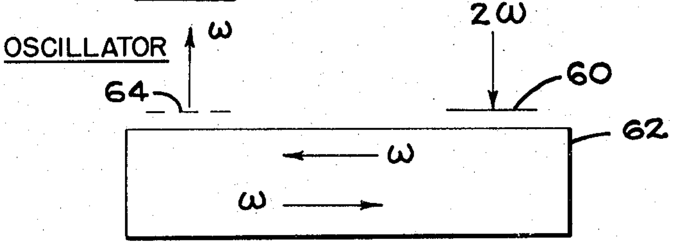
FIG. 6 is a diagrammatic view showing an oscillator embodying the present invention.

Finally, it can be observed in a related fashion that the basic mechanism of nonlinear parametric interaction can be utilized to provide an oscillator for a signal to be generated at a given frequency, $\omega$. With reference to FIG. 6, and because of the noted conditions for nonlinear parametric interaction, if sufficient input pump power at a frequency $2\omega$ is injected through a metal film transducer 60 into a piezoelectric crystal 62, contradirectional signal and idler waves will be generated at the frequency $\omega$ thus to provide oscillation at this latter frequency which can be withdrawn through a suitably tuned interdigital transducer 64. More particularly, since the pump signal is injected through the film transducer 60, its propagation vector $k$ equals zero. As a consequence, the oppositely propagating waves will have propagation vectors which are equal but opposite ($k = 0 = (\omega/v) - (\omega/v$ ) and to satisfy the frequency conservation condition, must be at one half the pump frequency ( $2\omega = \omega + \omega$ ).

It will be quite apparent that innumerable other applications of the same basic mechanism can be envisioned without departing from the spirit of the present invention, and accordingly, the foregoing descriptions of several embodiments are to be considered as purely exemplary and not in a limiting sense; and the actual scope of the invention is to be indicated only by reference to the appended claims.

What is claimed is:

1. Parametric acoustic surface wave apparatus which comprises, a piezoelectric medium, means for establishing at least two acoustic surface waves in said piezoelectric medium which meet the conditions for nonlinear parametric interaction, phase matching and frequency conservation, an output surface wave transducer adjacent said medium for effecting an acoustic-electric energy interchange whereby electrical energy resultant from the electric polarization in said medium can be coupled therefrom, said acoustic surface wave establishing means including a pair of input surface wave transducers adjacent said piezoelectric medium, said input transducers being arranged to generate two acoustic surface waves which propagate in opposite directions in said piezoelectric medium, said acoustic surface wave establishing means including means for applying first and second electromagnetic signals to said input transducers respectively, the first of said electromagnetic signals having the form of a delta function modulation pulse so as to interact with said second electromagnetic signal to time-invert the same.

2. Parametric surface acoustic wave apparatus according to claim 1 which comprises means for varying the time of applying the delta function modulation pulse.

* * * * *